Patented Dec. 21, 1943

2,337,313

UNITED STATES PATENT OFFICE 2,337,313

COMPOSITION CONTAINING BIS-(HALO-GENO ALIPHATIC AMIDO) DERIVATIVES OF DIVALENT HYDROCARBONS

Gaetano F. D'Alelio, Pittsfield, Mass., assignor to General Electric Company, a corporation of New York No Drawing. Application February 21, 1942, Serial No. 431,888

20 Claims. (Cl. 260—42)

This invention relates to the production of new materials and more particularly is concerned with synthetic compositions of particular utility in the plastics and coating arts and which contain, or are produced from, certain derivatives of divalent hydrocarbons hereafter identified. This application is a continuation-in-part of my co-pending application Serial No. 417,505, filed November 1, 1941, now Patent No. 2,312,693, issued March 2, 1943, and assigned to the same assignee as the present invention.

The derivatives of divalent hydrocarbons used in carrying the present invention into effect may be represented by the following general formula:

I 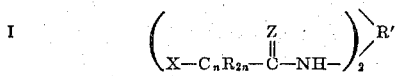

where $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, R' represents a member of the class consisting of divalent hydrocarbon and substituted hydrocarbon radicals, more particularly halo-hydrocarbon radicals, and X represents a halogen atom, more particularly a chlorine, bromine, fluorine or iodine atom. Since $n$ represents an integer which is 1 or 2, it will be seen that the halogen atom represented by X in all cases will be alpha or beta to the carbamyl or thiocarbamyl grouping.

Illustrative examples of monovalent radicals that R in the above formula may represent are: aliphatic (e. g., methyl, ethyl, propyl, isopropyl, allyl, butyl, secondary butyl, isobutyl, amyl, isoamyl, hexyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylisopropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. Preferably R in Formula I is hydrogen. However, there also may be used in carrying the present invention into effect compounds such, for instance, as those represented by the formulas:

II 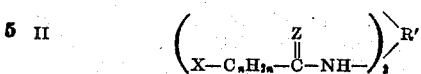

and, more particularly,

III 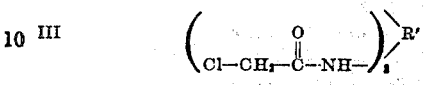

where $n$, Z, R' and X have the same meanings as given above with reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aliphatic-substituted aromatic, e. g., 2,4-tolylene, ethyl 2,5-phenylene, isopropyl, 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aromatic-substituted aliphatic or divalent aliphatic-substituted aromatic, e. g., 4,alpha-tolylene, 3,beta-phenyleneethyl, 4,alpha-xylylene, 2,gamma-phenylenebutyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent radicals are chloroethylene, chloropropylene, bromobutylene, chlorophenylene, chlorotolylene, bromophenylene, chloronaphthylene, bromonaphthylene, bromo 1,4-tolylene, chlorocyclopentylene, chloropentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

The derivatives of divalent hydrocarbons used in carrying the present invention into effect may be produced in various ways. One suitable method comprises effecting reaction between a halogenated aliphatic acyl halide and a diamine derivative of a divalent hydrocarbon in the presence of a hydrohalide acceptor, e. g., an alkali-metal hydroxide such as sodium hydroxide, potassium hydroxide, etc. The reaction advantageously is carried out in a suitable solvent such as water, alcohol or a mixture thereof, depending upon the solubility and reactivity of the individual reactants, and at a relatively low temperature, for example at temperatures of the order of 0–30° C. The reaction may be represented by the following general equation:

$$IV \quad 2X-\overset{Z}{\underset{\|}{C}}-C_nR_{2n}X + H_2N-R'-NH_2 \xrightarrow{\text{hydrohalide acceptor}}$$

$$X-C_nR_{2n}-\overset{Z}{\underset{\|}{C}}-NH-R'-NH-\overset{Z}{\underset{\|}{C}}-C_nR_{2n}X +$$

salt of hydrohalide acceptor where $n$, $Z$, $X$, $R$ and $R'$ have the same meanings as above given with reference to Formula I.

Specific examples of derivatives of divalent hydrocarbons embraced by Formula I that may be used in carrying the present invention into effect are listed below:

Bis-(chloroacetamido) ethane, more particularly alpha, beta-bis-(chloroacetamido) ethane
Bis-(chloroacetothionamide) ethane, more particularly alpha, beta-bis-(chloroacetothion-amido) ethane
Bis-(chloroacetamido) propanes
Bis-(chloroacetothionamido) propanes
Bis-(chloroacetamido) butanes
Bis-(chloroacetamido) pentanes
Bis-(chloroacetamido) benzenes
Bis-(chloroacetamido) toluenes
Bis-(chloroacetamido) xylenes
Bis-(chloroacetamido) naphthalenes
Bis-(chloroacetamido) octanes
Bis-(bromoacetamido) ethanes
Bis-(iodoacetamido) propanes
Bis-(fluoroacetamido) butanes
Bis-(beta-chloropropanamido) propanes
Bis-(alpha-bromopropanamido) propenes
Bis-(beta-iodopropanamido) butanes
Bis-(alpha-methyl beta-chloro propanamido) chloroisobutanes
Alpha, gamma - bis-(beta - chloropropanamido) propanes
Bis-(alpha - butyl beta - bromo propanamido) pentanes
Bis-(alpha-phenyl beta-chloro octanamido) isopentanes
Bis-(beta-chlorophenyl beta-bromo butanthion-amido) cyclopentanes
Bis-(alpha, alpha-ditolyl beta-chloro propan-amido) cyclopentenes
Bis-(alpha, alpha-diphenyl beta-bromo butan-amido) hexanes
Bis-(alpha-xylyl alpha-bromo butanamido) cyclohexanes
Bis-(alpha chlorotolyl alpha-methyl beta-chloro isopentanamido) chloro cyclohexenes
Bis-(chloro acetothionamido) cycloheptanes
Bis-(beta-bromopropanamido) benzenes
Bis-(beta-chloro 4-pentenamido) biphenyls
Bis-(bromocyclopentyl chloro acetamido) naphthalenes
2,4-bis-(cyclohexenyl bromo acetothionamido) chlorotoluene
2,5-bis-(beta-phenyl alpha-chloro propanamido) ethylbenzene
3,4 - bis - (beta-bromopropanamido) isopropyl-benzene
4,4'-bis-(chloroacetamido) diphenylmethane
2,4-bis-(cyclopentenyl chloro acetamido) 1-iso-butyl naphthalene
Alpha, beta-bis-(omega'-chloro alpha'-bromo pentanamido) phenylethane
Alpha, gama-bis-(chloroacetamido) phenylpropane
Alpha, alpha'-bis-(alpha''-naphthyl alpha''-tolyl beta''-cyclopentyl beta''-phenyl beta''-chloro propanthionamido) xylene
Bis-(bromoacetamido) propanes
Bis-(bromoacetamido) butanes
Bis-(bromoacetamido) benzenes
Bis-(bromoacetamido) toluenes The present invention is based on my discovery that new and valuable materials of particular utility in the plastics and coating arts can be produced by effecting reaction between ingredients comprising essentially an aldehyde, including polymeric aldehydes, hydroxyaldehydes and aldehyde-addition products, and a divalent hydrocarbon derivative of the kind embraced by Formula I, numerous examples of which have been given above. These new reaction products are not only valuable in themselves, but find particular utility when incorporated into an acid-curing thermosetting resin, for example acid-curing thermosetting phenoplasts and amino-plasts. For instance, I may add a soluble, fusible aldehyde-reaction product of the divalent hydrocarbon derivative to an acid-curing thermosetting resin and heat the resulting mixture. The reaction product of the aldehyde and the divalent hydrocarbon derivative accelerates the conversion of the acid-curing thermosetting resin to an insoluble, infusible state. Or, I may cause the divalent hydrocarbon derivative itself to react with the acid-curing thermosetting resin and thus accelerate the curing of the resin. Or, I may form a rapidly curing resin by effecting reaction between ingredients comprising a divalent hydrocarbon derivative of the kind embraced by Formula I, an aldehyde, including polymeric aldehydes, hydroxyaldehydes and aldehyde-addition products, and a phenol (including phenol itself, cresols, xylenols, etc.) or an amino or amido compound (including imino and imido compounds), e. g., aminotriazines, e. g., melamine, aminotriazoles, e. g., guanazole, aminodiazines, e. g., 2,4,6-triamino pyrimidine, a urea, e. g., urea itself, thiourea, dicyandiamide, etc.

The resin syrups and molding compositions of this invention may be stored for long periods of time without material alteration. In marked contrast the prior acid-curing thermosetting resins, more particularly those containing direct or active curing catalysts such as acids, e. g., hydrochloric, ethyl sulfuric, phthalic, chloroacetic, phosphoric, etc., lacked time or storage stability. This necessitated early use of the material after incorporating the catalyst.

Furthermore, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions and at normal or at elevated temperatures. Any substance or catalyst which has an alkaline or an acid nature may be used to obtain the acid, alkaline or neutral condition, as for example, ammonia, sodium hydroxide, calcium hydroxide, methyl amine, diethyl amine, tributyl amine, ethanol amines, tri-iso-propanol amine, etc.; mixtures of such alkaline substances; inorganic or organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; basic salts such as ammonium carbonate, potassium carbonate, sodium acetate, etc.; or mixtures of such salts.

I may condense the components used in practicing this invention under various conditions. For example, all the components may be mixed together and the reaction caused to proceed under acid, alkaline or neutral conditions. Or, I may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiourea, etc., and an aldehyde), add the divalent hydrocarbon derivative thereto and effect further condensation. Or, I may first partially condense the divalent hydrocarbon derivative with an aldehyde under acid, alkaline or neutral conditions and then add thereto at least one other aldehyde-reactable organic compound, e. g., a phenol, a urea, aniline, etc., and effect further condensation. Also, I may separately partially condense a divalent hydrocarbon derivative of the kind embraced by Formula I and a different aldehyde-reactable organic compound with an aldehyde and then mix the two products of partial condensation and effect further condensation therebetween. The components of each reaction product may be initially condensed under acid, alkaline or neutral conditions.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

*Example 1*

| | Parts |
|---|---|
| Soya bean protein | 30.0 |
| 4,6-diamino pyrimidyl-2 para-sulfamyl-phenyl-carbamyl-methyl sulfide | 17.8 |
| Aqueous formaldehyde (approx. 37.1% HCHO) | 81.0 |
| Aqueous solution of sodium hydroxide (0.46 N) | 2.0 |
| Water | 50.0 |
| Alpha, beta-bis-(chloroacetamido) ethane, which also may be named N,N'-bis-chloroacetyl ethylene diamine | 0.2 |

All of the above ingredients with the exception of the bis-(chloroacetamido) ethane were heated together under reflux at boiling temperature for 4 minutes. The bis-(chloroacetamido) ethane was now added and the resulting mixture immediately was mixed with 41.4 parts alpha cellulose and 0.2 part of a mold lubricant, specifically zinc stearate. The wet compound was air dried at room temperature. A well-cured molded piece was produced by molding a sample of the dried and ground compound for 3 minutes at 140° C. under a pressure of 3,600 pounds per square inch.

*Example 2*

| | Parts |
|---|---|
| Urea | 30.0 |
| Aqueous formaldehyde (approx. 37.1% HCHO) | 64.8 |
| Aqueous ammonia (approx. 28% NH₃) | 3.0 |
| Aqueous solution of sodium hydroxide (0.46 N) | 1.5 |
| Alpha, beta-bis-(chloroacetamido) ethane | 0.6 |

All of the above ingredients with the exception of the bis-(chloroacetamido) ethane were heated together under reflux at the boiling temperature of the mass for 15 minutes. The bis-(chloroacetamido) ethane was now added and refluxing was continued for an additional 5 minutes to cause it to intercondense with the urea-formaldehyde partial condensation product. The resulting resinous syrup was mixed with 33.3 parts alpha cellulose and 0.2 part zinc stearate to form a molding composition. The wet molding compound was dried at room temperature until sufficient moisture had been removed to provide a material that could be molded satisfactorily. A sample of the dried and ground molding compound was molded for 3 minutes at 140° C. under a pressure of 4,500 pounds per square inch. A well-cured molded piece was obtained, as shown by the fact that it absorbed only 2.7% by weight of water when immersed in boiling water for 15 minutes followed by immersion in cold water for 5 minutes. (The ordinary urea-formaldehyde molding compositions yield molded articles which, when similarly tested for water resistance, show a water-absorption value of about 5 to 7%.) The molding compound showed good flow characteristics during molding.

*Example 3*

| | Parts |
|---|---|
| Melamine | 37.8 |
| Aqueous formaldehyde (approx. 37.1% HCHO) | 72.9 |
| Aqueous ammonia (approx. 28% NH₃) | 1.7 |
| Aqueous solution of sodium hydroxide (0.46 N) | 2.0 |
| Alpha, beta-bis-(chloroacetamido) ethane | 0.4 |

All of the above ingredients with the exception of the bis-(chloroacetamido) ethane were heated together under reflux at the boiling temperature of the mass for 15 minutes. The bis-(chloroacetamido) ethane was now added and the resulting syrupy condensation product immediately was mixed with 38.3 parts alpha cellulose and 0.2 part zinc stearate to form a molding compound. The wet molding composition was dried at 70° C. until the moisture content had been reduced to a point where the compound could be molded satisfactorily. A sample of the dried and ground molding compound was molded into the form of a disk, using a molding time of 3 minutes, a molding temperature of 140° C. and a molding pressure of 9,000 pounds per square inch. The molded disk was well cured and had excellent resistance to water, as shown by the fact that it absorbed only 0.24% by weight of water when tested for its water-resistance characteristics as described under Example 2. The molding compound showed good plastic flow during molding.

Example 4

| | Parts |
|---|---|
| Melamine | 37.8 |
| Thiourea | 22.8 |
| Aqueous formaldehyde (approx. 37.1% HCHO) | 121.5 |
| Aqueous ammonia (approx. 28% NH₃) | 3.4 |
| Aqueous solution of sodium hydroxide (0.46 N) | 4.0 |
| Alpha, beta-bis-(chloroacetamido) ethane | 0.6 |

All of the above ingredients with the exception of the bis-(chloroacetamido) ethane were heated together under reflux at boiling temperature for 10 minutes. The bis-(chloroacetamido) ethane was added and refluxing was continued for an additional 4 minutes. A molding composition was made from the resulting syrupy condensation product by mixing therewith 63.3 parts alpha cellulose and 0.3 part zinc stearate. The wet molding compound was dried at 70° C. as described under Example 3. A molded piece produced by molding a sample of the dried and ground molding compound under the conditions described under Example 3 was well cured and had a good surface appearance. It had excellent resistance to water as shown by the fact that it absorbed only 0.76% by weight of water when tested for its water-resistance as described under Example 2. The molding compound showed good flow characteristics during molding.

Example 5

| | Parts |
|---|---|
| Dimethylol urea (commercial grade, containing approx. 11% by weight of water) | 54.0 |
| Alpha, beta-bis-(diamino triazinyl thio acetamido) ethane | 12.7 |
| Aqueous ammonia (approx. 28% NH₃) | 6.6 |
| Aqueous solution of sodium hydroxide (0.46 N) | 3.2 |
| Water | 100.0 |
| Alpha, beta-bis-(chloroacetamido) ethane | 0.6 |

All of the above ingredients with the exception of the bis-(chloroacetamido) ethane were heated together under reflux at the boiling temperature of the mass for 13 minutes. The bis-(chloroacetamido) ethane was now added and refluxing was continued for an additional 13 minutes. The resulting syrupy condensation product was mixed with 59.0 parts alpha cellulose and 0.3 part zinc stearate to form a molding compound. The wet molding composition was dried at 70° C. as described under Example 3. A well-cured molded article, having a well-knit and homogeneous structure, was obtained by molding a sample of the dried and ground molding compound for 5 minutes at 140° C. under a pressure of 6,750 pounds per square inch. The molded piece had good water resistance, as shown by the fact that it absorbed only 2.8% by weight of water when tested for its water-resistance characteristics as described under Example 2.

Example 6

| | Parts |
|---|---|
| Aminotriazole, specifically 1-phenyl guanazole | 13.1 |
| Aqueous formaldehyde (approx. 37.1% HCHO) | 18.1 |
| Aqueous solution of sodium hydroxide (0.46 N) | 0.8 |
| Alpha, beta-bis-(chloroacetamido) ethane | 0.2 | were heated together in an open vessel on a steam plate for a short period until a resin layer had separated. A molding composition was prepared by mixing with the reaction mass 10.7 parts alpha cellulose and 0.2 part zinc stearate. The wet molding compound was dried at 70° C. as described under Example 3. A well-cured molded piece having excellent water resistance was produced by molding a sample of the dried and ground molding compound for 5 minutes at 140° C. under a pressure of 4,500 pounds per square inch.

Example 7

A syrupy phenolic resin is prepared from the following components:

| | Parts |
|---|---|
| Phenol (95% phenol, 5% water) | 94.7 |
| Aqueous formaldehyde (approx. 37.1% HCHO) | 195.0 |
| Sodium carbonate | 2.19 |

The above ingredients are heated with constant stirring at an average temperature of 65° C. over a period of 4½ hours, yielding a syrupy condensation product which is identified in the following formula as "syrupy phenolic resin":

| | Parts |
|---|---|
| Syrupy phenolic resin | 125.0 |
| Alpha, beta-bis-(chloroacetamido) ethane | 3.2 |

These components are heated together under reflux at the boiling temperature of the mass for 15 minutes. The resulting resinous condensation product is mixed with 44 parts alpha cellulose and 0.2 part zinc stearate to yield a molding compound, which thereafter is dried and ground. A well-cured molded piece is obtained by molding a sample of the dried and ground molding compound for 10 minutes at 140° C. under a pressure of 6,750 pounds per square inch.

Example 8

| | Parts |
|---|---|
| Alpha, beta-bis-(chloroacetamido) ethane | 21.3 |
| Aqueous solution of formaldehyde (approx. 37.1% HCHO) | 40.5 | are shaken continuously in a flask for 24 hours at room temperature, yielding a soluble, fusible aldehyde-reaction product of the bis-(chloroacetamido) ethane that may be used as a curing agent for acid-curing thermosetting resins as described under the preceding examples with particular reference to alpha, beta-bis-(chloroacetamido) ethane.

Example 9

| | Parts |
|---|---|
| Alpha, beta-bis-(chloroacetamido) ethane | 21.3 |
| Aqueous solution of formaldehyde (approx. 37.1% HCHO) | 32.4 | are heated together under reflux at the boiling temperature of the mass for 5 minutes. The resulting condensation product may be used as a curing agent for acid-curing thermosetting resins as described under Examples 1 to 7, inclusive, with reference to alpha, beta-bis-(chloroacetamido) ethane.

It will be understood, of course, by those skilled in the art that my invention is not limited to condensation products obtained by reaction of ingredients comprising an aldehyde and the specific divalent hydrocarbon derivative named in the above illustrative examples. Thus, instead of alpha, beta-bis-(chloroacetamido) ethane, I may use alpha, beta-bis-(bromoacetamido) ethane, a bis-(chloroacetamido) propane, or any other divalent hydrocarbon derivative (or mixture thereof) embraced by Formula I, numerous specific examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, hydroxyaldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, mono- and poly-(N-carbinol) derivatives of the aminotriazines, of the aminotriazoles, of the aminodiazines, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the divalent hydrocarbon derivative may be varied over a wide range depending, for instance, upon the particular properties desired in the final product. Thus, I may use, for example, from 0.5 to 6 or 7 or more mols of an aldehyde for each mol of the divalent hydrocarbon derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example from 1 to 12 or 15 or more mols of such alklol derivatives for each mol of the divalent hydrocarbon derivative.

When the divalent hydrocarbon derivative of the kind embraced by Formula I is used primarily as an intercondensable curing reactant for accelerating the conversion of acid-curing thermosetting resins to an insoluble, infusible state, only a relatively small amount of such divalent hydrocarbon derivative ordinarily is required, for example an amount corresponding to from 0.1 or 0.2% to 2 or 3% by weight of the resin to be cured, calculated on the basis of the dry resin. In some cases it may be desirable to use higher amounts, for instance up to 5 or 6 or more parts by weight of the divalent hydrocarbon derivative per 100 parts (net dry) of the acid-curing thermosetting resin. When the divalent hydrocarbon derivative is incorporated into the acid-curing thermosetting resin in the form of a soluble, fusible aldehyde-reaction product thereof, then higher amounts of such reaction product ordinarily are used as compared with the amount employed when using the divalent hydrocarbon derivative itself. The divalent hydrocarbon derivative or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the divalent hydrocarbon derivatives herein described or by their soluble, fusible aldehyde-reaction products, are the acid-curing phenol-aldehyde resins, aminotriazine-aldehyde resins, e. g., melamine-formaldehyde resins, aminotriazole-aldehyde resins, urea-aldehyde resins, urea-aminotriazine-aldehyde resins, aminodiazine-aldehyde resins, protein-aldehyde resins, e. g., casein-formaldehyde resins; resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, asymmetrical diethyl urea, allyl urea, 2-chloroallyl urea, ethylidene urea, guanyl urea, biguanidine, aminoguanidine, melamine, triureido melamine, ammeline, ammelide, melem, melam, melon, aminotriazoles, aminodiazines, etc. Suitable mixtures of such compounds also may be used.

Phenol itself and various substituted phenols, for example the cresols, the xylenols, etc., may be condensed with aldehydes, e. g., formaldehyde, furfural, etc., to form acid-curing thermosetting resins of the phenoplast type, and these thermosetting resins then can be cured to the insoluble and infusible state with the aid of the hereindescribed divalent hydrocarbon derivatives or with the soluble, fusible aldehyde-reaction products of such derivatives.

If desired, the fundamental reaction products of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53-75, page 4, column 1, lines 1-40, which patent is assigned to the same assignee as the present invention.

Thermosetting molding compositions comprising a filler and an acid-curing thermosetting resin carrying a curing agent comprising a divalent hydrocarbon derivative of the kind hereindescribed, or a soluble, fusible aldehyde-reaction product of such a derivative, may be molded into a variety of shapes under heat and pressure, more particularly at temperatures of the order of 100° to 200° C., preferably from approximately 120° to 180° C. The molding compositions show good plastic flow during molding, since the curing agent not only functions as such but also generally serves to impart improved plastic flow to the molding composition. Molded articles of manufacture comprising the molded, heat-hardened molding compositions of this invention have a good surface finish, show no evidence of "bleeding" the curing agent, are well cured throughout, and show no loss in any of their other useful properties due to the presence of the hereindescribed divalent hydrocarbon derivative or aldehyde-reaction product thereof.

What I claim as new and desire to secure by Letters Patent of the United States is:

1. A composition comprising an acid-curing, thermosetting resin having incorporated therein a curing agent therefor comprising a compound selected from the class consisting of (1) compounds represented by the general formula

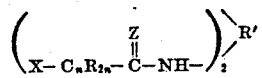

where $n$ represents an integer and is at least 1 and not more than 2, Z represents a member of the class consisting of oxygen and sulfur, R represents a members of the class consisting of hydrogen and monovalent hydrocarbon and halohydrocarbon radicals, R' represents a member of the class consisting of divalent hydrocarbon and halo-hydrocarbon radicals, and X represents a halogen atom; and (2) soluble, fusible aldehyde-reaction products of the compounds of (1).

2. A composition comprising an acid-curing, thermosetting, phenol-aldehyde resin having incorporated therein a compound represented by the general formula

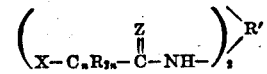

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

3. A composition comprising an acid-curing, thermosetting, amidogen-aldehyde resin having incorporated therein a compound represented by the general formula

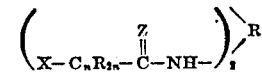

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

4. A composition of matter comprising the product of reaction of ingredients comprising an aldehyde and a compound represented by the general formula

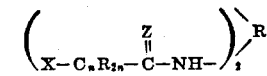

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

5. A composition as in claim 4 wherein the aldehyde is formaldehyde.

6. A composition comprising the product of reaction of ingredients comprising a phenol, an aldehyde and a compound represented by the general formula

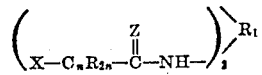

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

7. A composition comprising the product of reaction of ingredients comprising a urea, an aldehyde and a compound represented by the general formula

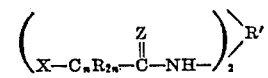

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

8. A composition comprising the product of reaction of ingredients comprising an aminotriazine, an aldehyde and a compound represented by the general formula

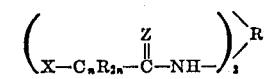

where $n$ represents an integer and is at least 1 and not more than 2, Z represents a member of the class consisting of oxygen and sulfur, R represents a member of the class consisting of hydrogen and monovalent hydrocarbon and halohydrocarbon radicals, R' represents a member of the class consisting of divalent hydrocarbon and halo-hydrocarbon radicals, and X represents a halogen atom.

9. A heat-curable resinous condensation product of ingredients comprising urea, formaldehyde and a compound represented by the general formula

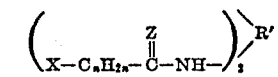

where $n$ represents an integer and is at least 1 and not more than 2, Z represents a member of the class consisting of oxygen and sulfur, R' represents a divalent hydrocarbon radical, and X represents a chlorine atom.

10. A product comprising the cured resinous condensation product of claim 9.

11. A composition comprising the resinous product of reaction of ingredients comprising melamine, formaldehyde and a compound represented by the general formula

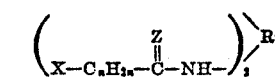

where $n$ represents an integer and is at least 1 and not more than 2, Z represents a member of the class consisting of oxygen and sulfur, R' represents a divalent hydrocarbon radical, and X represents a chlorine atom.

12. A composition comprising the resinous product of reaction of (1) a partial condensation product of ingredients comprising a phenol and an aldehyde, and (2) a compound represented by the general formula

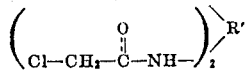

where R' represents a member of the class consisting of divalent hydrocarbon and halo-hydrocarbon radicals.

13. A composition comprising the resinous product of reaction of (1) a partial condensation product of ingredients comprising a urea and an aldehyde, and (2) a compound represented by the general formula

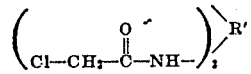

where R' represents a member of the class consisting of divalent hydrocarbon and halo-hydrocarbon radicals.

14. A resinous composition comprising the product of reaction of (1) a partial condensation product obtained by reaction, while admixed with an alkaline substance, of ingredients comprising urea and formaldehyde, and (2) alpha, beta-bis-(chloroacetamido) ethane.

15. A resinous composition comprising the product of reaction of (1) a partial condensation product obtained by reaction, while admixed with an alkaline substance, of ingredients comprising urea and formaldehyde, and (2) a bis-(chloroacetamido) benzene.

16. A resinous composition comprising the product of reaction of ingredients comprising dimethylol urea and alpha, beta-bis-(chloroacetamido) ethane.

17. A resinous composition comprising the product of reaction of (1) a partial condensation product obtained by reaction, while admixed with an alkaline substance, of ingredients comprising melamine and formaldehyde, and (2) alpha, beta-bis-(chloroacetamido) ethane.

18. A thermosetting molding composition comprising a filler and an acid-curing partial condensation product of ingredients comprising urea and formaldehyde, said condensation product having incorporated therein a small amount of a curing agent comprising alpha, beta-bis-(chloroacetamido) ethane.

19. The method of preparing new condensation products which comprises effecting reaction between ingredients comprising an aldehyde and a compound represented by the general formula

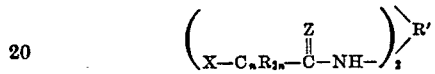

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

20. The method which comprises effecting partial reaction between ingredients comprising urea and formaldehyde under alkaline conditions, adding to the resulting partial condensation product a small amount of alpha, beta-bis-(chloroacetamido) ethane, and causing the said bis-(chloroacetamido) ethane to intercondense with the said partial condensation product.

GAETANO F. D'ALELIO.

CERTIFICATE OF CORRECTION.

Patent No. 2,337,313.   December 21, 1943.

GAETANO F. D'ALELIO.

It is hereby certified that error appears in the printed specification of the above numbered patent requiring correction as follows: Page 2, first column, line 24, for "chloroacetothionamide" read --chloroacetothionamido--; line 58, for "alpha chlorotolyl" read --alpha-chlorotolyl--; and second column, line 1, for "gama" read --gamma--; page 5, first column, line 53, for "alklol" read --alkylol--; page 6, first column, line 18, for "members" read --member--; and second column, line 6, in the formula, for "$R_1$" read --$R'$--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.